United States Patent [19]

Faulkner

[11] Patent Number: 5,012,252

[45] Date of Patent: Apr. 30, 1991

[54] METHODS OF RECOGNIZING TARGETS

[75] Inventor: Alistair R. Faulkner, Harold Wood, United Kingdom

[73] Assignee: GEC Avionics Limited, Rochester, United Kingdom

[21] Appl. No.: 895,004

[22] Filed: Jun. 18, 1986

[30] Foreign Application Priority Data

Jun. 28, 1985 [GB] United Kingdom ............... 8516426

[51] Int. Cl.⁵ ...................... G01S 13/88; G01S 13/10
[52] U.S. Cl. .................................................. 342/192
[58] Field of Search ........................................ 342/192

[56] References Cited

U.S. PATENT DOCUMENTS

| | | | |
|---|---|---|---|
| 3,984,802 | 10/1976 | Lippel, Jr. et al. ............ | 342/192 X |
| 3,992,710 | 11/1976 | Gabriele et al. ................ | 342/192 X |
| 4,470,048 | 9/1984 | Short, III ....................... | 342/192 X |
| 4,490,718 | 12/1984 | Opitz et al. ..................... | 342/192 |
| 4,603,331 | 7/1986 | Wehner ............................ | 342/192 |

OTHER PUBLICATIONS

M. I. Skolnik, "Introduction to Radar Systems" (2nd Edition), published 1981, McGraw-Hill, pp. 434-438.
"Applications of Digital Signal Processing", A. V. Oppenheim, Editor, Prentice-Hall, Inc., Englewood Cliffs, New Jersey, pp. 169 to 237.

*Primary Examiner*—T. H. Tubbesing
*Attorney, Agent, or Firm*—Spencer & Frank

[57] ABSTRACT

In order to identify a target a data base is compiled containing records, for each of different known types of object, each record being derived from successive range sweeps of the object as seen from different angles and containing information defining the relative positions of different points of reflection on the object. In order to identify an unidentified object, information from at least one range sweep across it (and preferably a number of such range sweeps taken when viewing the object from different angles) is compared with similar information recorded in the data base to ascertain whether the unidentified object belongs to one of the known types.

2 Claims, 4 Drawing Sheets

METHODS OF RECOGNIZING TARGETS

BACKGROUND OF THE INVENTION

This invention relates to a method of recognizing a target in which method an attempt is made to recognize, in received radar signals, characteristics which enable a reasoned judgement to be made as to the identity or nature of the target.

Hitherto, attempts to do this have generally relied on such things as polarization, strength, and Doppler content of the received signal. These measures can only hope to give a rough indication of the nature of the target, for example to distinguish between a small aircraft and a large ship. They cannot distinguish between or identify particular types of ship or aircraft.

SUMMARY OF THE INVENTION

This invention attempts to enable different types of similar target to be identified: such as different classes of ship.

The invention provides a method of recognizing a target comprising creating a data base constituting a record of information deduced from radar returns representing successive range sweeps across an object of known type as seen from different angles and comparing information from at least one range sweep across an unidentified object with similar information recorded in the data base to ascertain whether the unidentified object is of the known type.

The invention also provides apparatus for recognizing a target comprising: a data base containing records for each of different known types of ob t each said record representing information derived from successive range sweeps across the object as seen from different angles; a pulse radar for providing signals representing range sweeps across an unidentified object., and comparator means for comparing information from at least one range sweep received from an unidentified object with similar information recorded for each type of object in the data base to ascertain whether the unidentified object belongs to one of the known types.

Because the principle of the invention relies on looking at the distribution in range of different points of reflection on the object to be identified, it is effective independent of the absolute range of the object and the resolution is not degraded with an increase in the absolute range as would be the case with a system which relied on angular resolution.

The method of the invention preferably includes the step of identifying, in the returns used to create the data base, lines of continuity in peaks of amplitude extending through successive range sweeps. Each such line can be assumed to represent the locus of important reflection points on the object and these lines alone are preferably recorded in the data base.

The shape of the lines and their relationship to each other define the relative positions of the reflection points and so another possibility would be to record in the data base, not the lines, but an indication of the aforementioned relative positions.

During an identification process, if signals are received from an object under observation over a sufficiently wide angular spread, a process similar to that carried out during the preparation of the data base can be performed resulting in the identification of similar lines of continuity and/or a deduction of the relative positions of reflection points. It is then possible to recognize whether the object under observation is of the type recorded in the data base by comparing the two sets of lines or the two sets of relative positions.

If a point of reflection is such as to have different reflection properties when viewed from different angles, the strength of the received signal will vary along one of the identified lines. Also, the length of the identifiable line will vary with the characteristics of the feature giving rise to the reflection. The nature of the variations can be used to distinguish between different types of reflection point.

If signals can only be received from an object to be identified from one particular aspect angle, it is not possible to identify the aforementioned lines in the received signal. In such cases the received signal from the single aspect angle can be compared with the recorded data in the data base for each successive range sweep at all possible aspect angles. The range sweep is received data concerning features located radially with respect to the radar.

If the aspect angle, or an approximation to it, is known, e.g. by the direction of motion of a target such as a ship which can be assumed to be travelling forwards, the comparison process can advantageously be restricted to a particular part of the data base.

In the case of a ship, the data base may constitute a record of returns from different angles, all of which lie in the horizontal plane. Additionally, or alternatively, they can be from different angles in a vertical plane or in any other non-horizontal plane or planes.

BRIEF DESCRIPTION OF THE DRAWINGS

One way in which the invention may be performed will now be described by way of example with reference to the accompanying drawings, in which.

DETAILED DESCRIPTION OF THE PREFERRED EMBODIMENT

Figure 1:
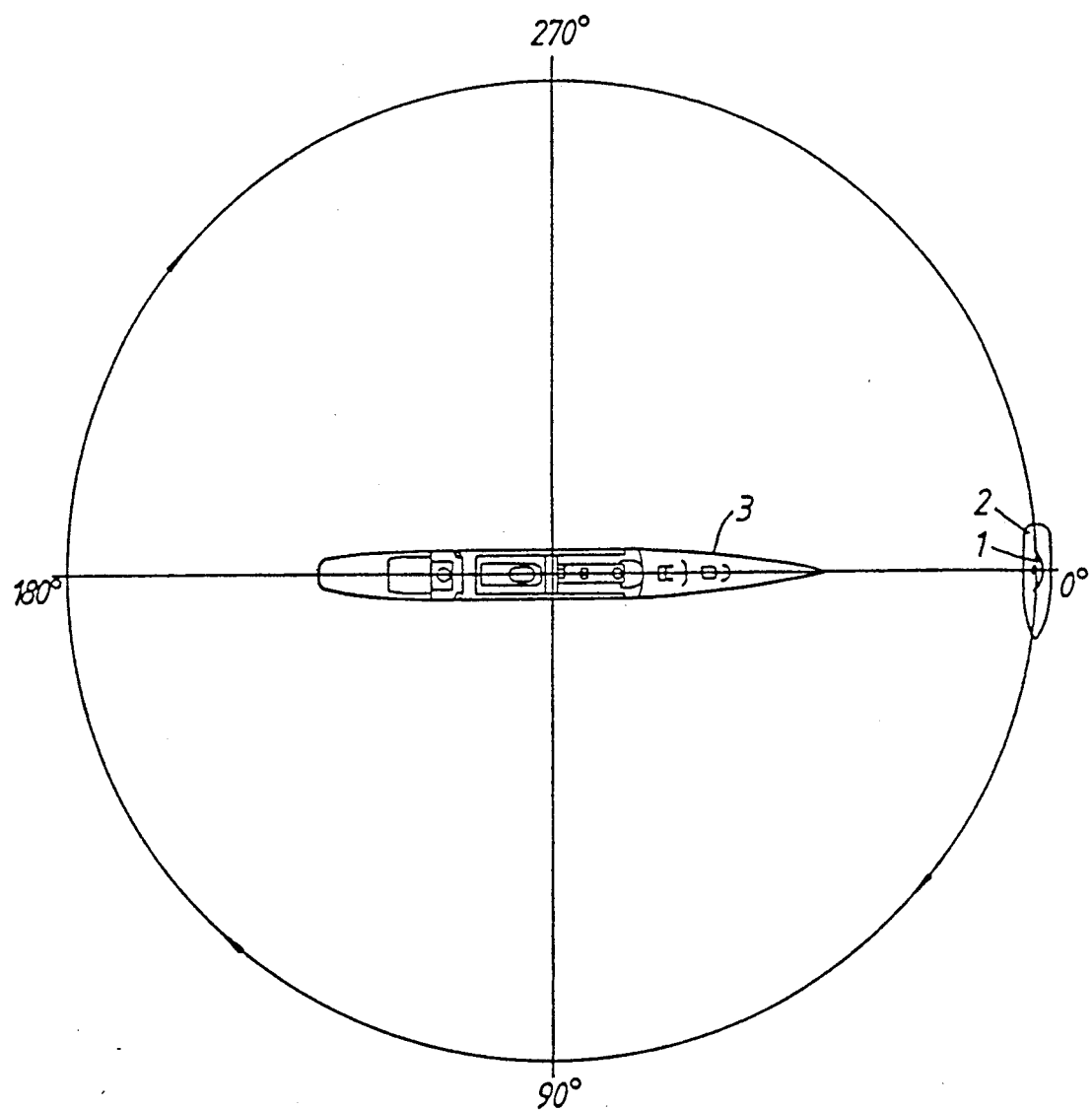
FIG. 1 illustrates the process of recording data relating to a ship for use in a data base.
Figure 2:
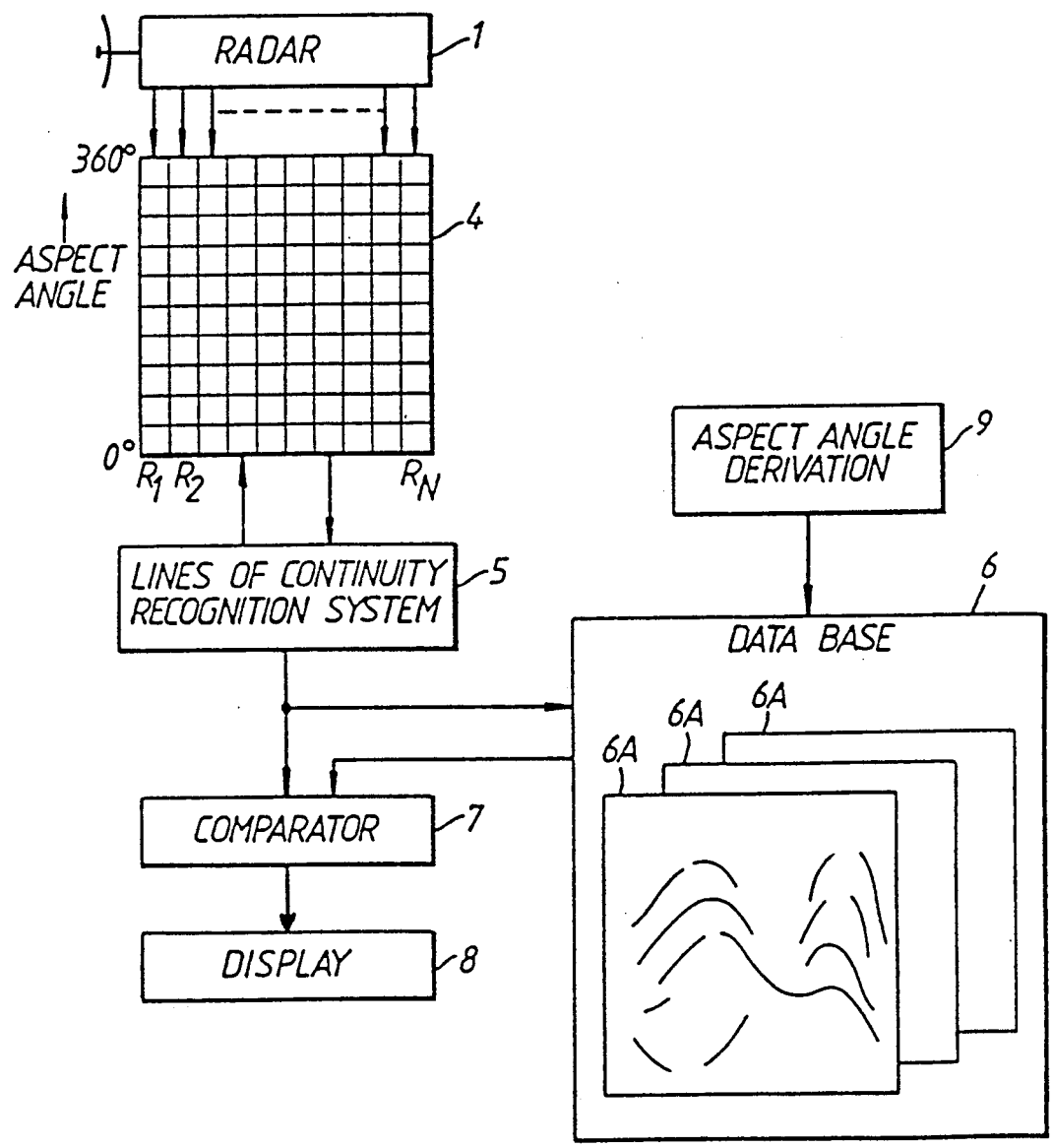
FIG. 2 illustrates apparatus used for recording and subsequently using the data to identify an unknown target.

Referring to FIGS. 1 and 2, a radar 1 is located on a ship 2 (an aircraft could alternatively be used) which is caused to encircle another ship 3 whilst adjusting the bore-sight of the radar to point towards the ship 3. This process is repeated for ships 3 of different types which it may be desired to recognise on subsequent occasions. In an alternative method it would be possible to make the ship 3 turn on its axis with the radar 1 remaining stationary. Another possibility would be for the ship 3 to turn in a tight circle.

The output of the radar 1 is fed into a store 4 (FIG. 2) where the vertical columns represent different range cells and the horizontal rows represent range sweeps received from different aspect angles. The number of range cells and range sweeps is shown greatly reduced in FIG. 2 and in practice the content of the store 4 might look as shown on FIG. 3 where the horizontal co-ordinate represents the aspect angle corresponding to the angle shown on FIG. 1; the vertical co-ordinate represents range; and each dot represents a peak in the return signal whose amplitude is represented by the size of the dot. The store 4 can be a part of a random access digital memory or a disc included in a conventional computer such as a 68K microcomputer, e.g., a Hewlett Packard 9836. Lines of continuity extending in the horizontal direction i.e. across successive range sweeps are now identified by a process mechanism 5 provided by a suitable program in the aforementioned computer. Such a program can follow principles conventionally used in image recognition systems, e.g., as explained in "Application of Digital Signal Processing" by A. V. Oppenheim (Prentiss-Hall).

Figure 3:
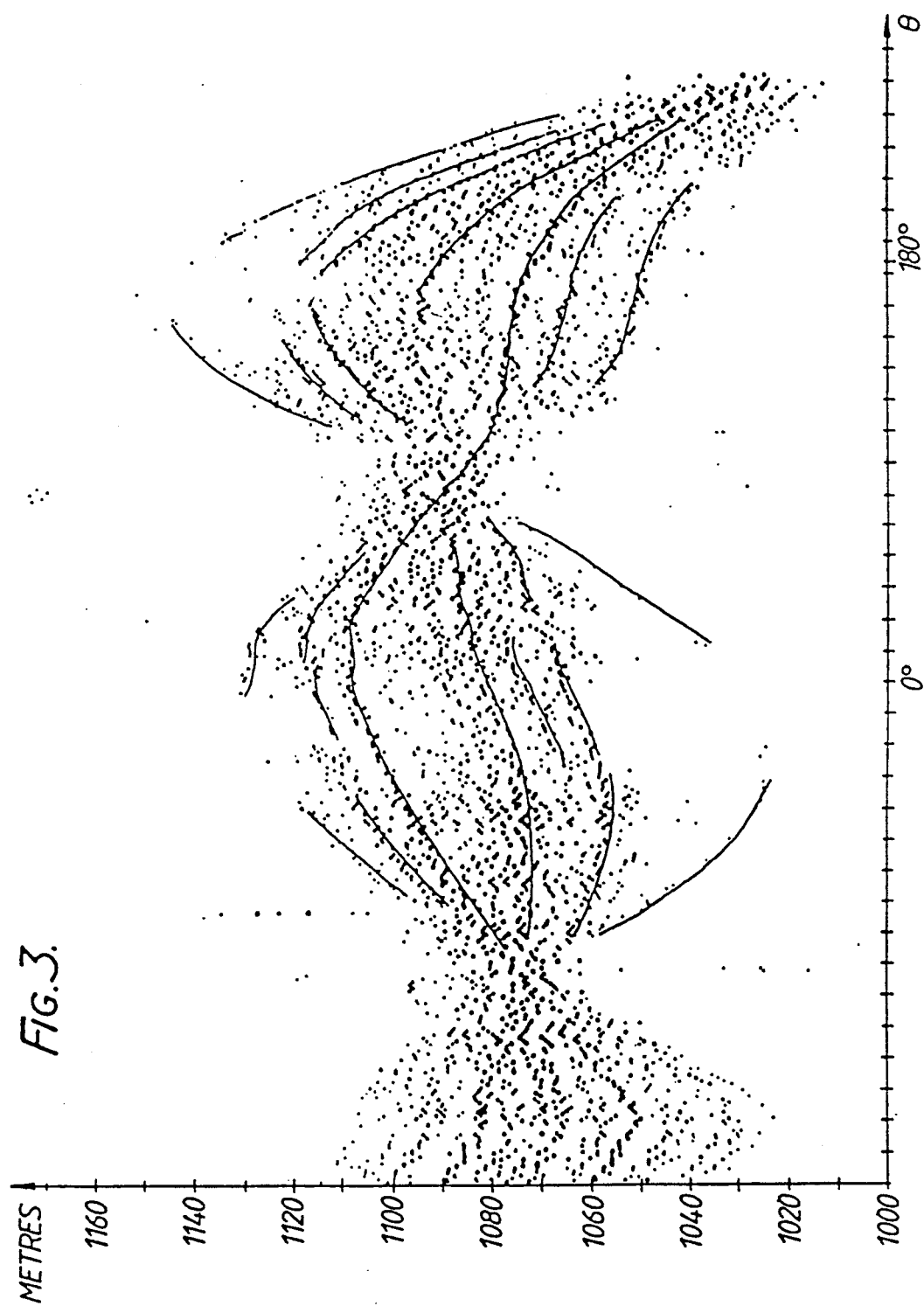
FIG. 3 illustrates radar returns received during the operation illustrated in FIG. 1.

The lines of continuity can alternatively be identified by visual inspection of a display of the content of the store 4. The information defining these lines, which are shown on FIG. 3, is recorded in one area 6A of a store 6 either automatically as in the illustrated system where the lines of continuity are identified automatically; or manually, using a digitizer provided with a light pen or similar device if the lines of continuity are identified by visual inspection. The store 6 can be another part of the memory previously referred to. Different areas 6A of the store 6 are used to record data covering ships of different types so that the store 6 forms a data base defining characteristics of all those ships which may be encountered.

So far, only the process of compiling the data base has been described. When it is subsequently required to identify a potential target exactly, the same process is performed at memory 4 and system 5, except of course that it may not be possible to view the potential target 3 for more than a limited bracket of aspect angles $\theta$. Thus a pattern of lines, like those shown on FIG. 3, for only a limited bracket of aspect angles may be available at system 5 from the received signal. Each such pattern of lines is compared by a processing mechanism or comparator 7 with data (for all aspect angle brackets of similar width) in the data base 6. If a match is found in any of the store parts 6A, the identity of that store part indicates the type of ship under observation. This information is displayed on display 8. The processing mechanism 7 can be provided by another program controlling the aforementioned computer. Such a program can also follow conventional principles e.g. as described in "Applications of Digital Signal Processing", A. V. Oppenheim, Editor, Prentice-Hall, Inc., Englewood Cliffs, N.J., pages 169 to 237.

In some circumstances it may be possible to provide some means by which the aspect angle of the ship under observation may be known either precisely or approximately. In the illustrated system a mechanism 9 is included which deduces from the radar returns the direction of motion of the ship under observation and thus a bracket of angles, e.g. 0° to 90° within which the ship can be assumed to lie. The mechanism 9 is provided by another program or sub-program controlling the aforementioned computer and acting on the output of the radar system in a conventional manner. The output of the mechanism 9 controls access by the comparator 7 to the data base 6 so as to limit the comparison process to those parts of each store location 6A appropriate to those aspect angles. If the bracket of attitude values of the target under observation is not known, the data from the received signal within this unknown bracket must be correlated with all brackets of similar width in the recorded information in an endeavour to find a match. If the target can only be observed for a single attitude, the correlation will be between the lines of FIG. 3, in the data base, and points, for a single $\theta$ value, from the received signal. In an alternative system a programmed computer can be used to calculate, for each angle (i.e. each range sweep), the difference in range between a pair of lines such as shown on FIG. 3 which lines of the pair are overlapping in the sense that they occupy a common bracket of aspect angles. The variation of that difference with aspect angle is a sine wave, because one point moves around the other. The amplitude (representing range difference) and phase of the sine wave give the position of the two points on a ship relative to one another. The computer deduces the relative positions for each pair of points and from this information calculates the absolute positions on the ship of the reflection points.

Figure 4:
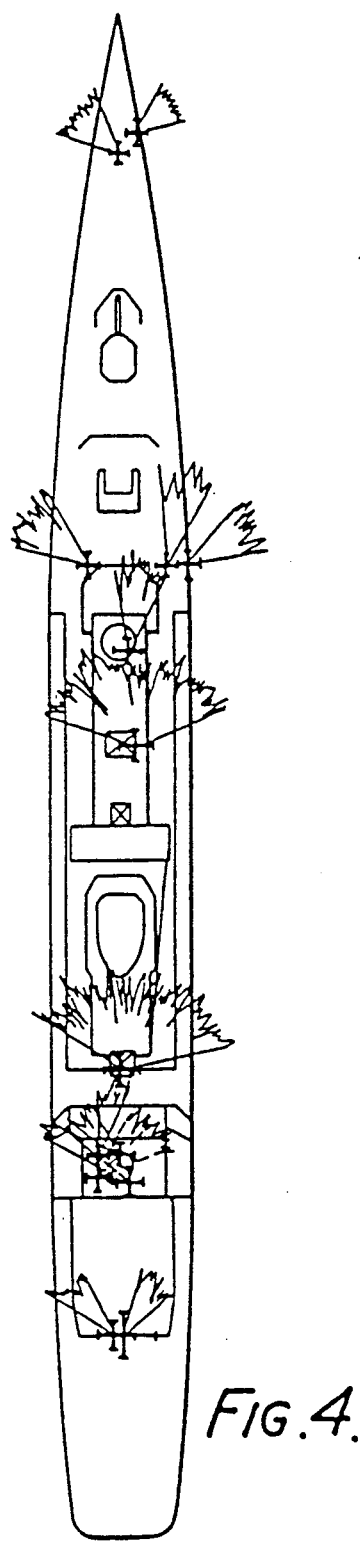
FIG. 4 is a pictorial representation of the information given by the lines shown in FIG. 2 superimposed on an outline of the ship.

The output of the computer is shown on FIG. 4 where the position of each reflection point is indicated by a cross shown, for the purposes of explanation, on a plan of the ship. For each such point, the variation of reflectivity with aspect angle, as given by the variation in the intensity of the received signal along the corresponding line of FIG. 3, is shown as a polar diagram.

In this alternative system the information, like that shown on FIG. 4, is recorded in a data base like that shown at 6, for all ship types of interest and is compared with similar information found during an exercise to identify an unknown ship. During compilation of the data base it will be appreciated that the absolute range of the ship 3 or other feature being recorded may vary. This can be due to failure of the observation vessel 2 to make a perfect circle around the ship 3 or due to the motion of the ship 3. For this reason the comparator 7 should compare the relative ranges of the different reflecting points on the vessel rather than their absolute ranges.

I claim:

1. Apparatus for recognizing a target comprising: a data base containing a respective record, for each of different known types of object; means for recording peaks of amplitude at different ranges obtained from radar returns representing successive range sweeps across a known object as seen from different angles; a processing means for identifying, from said recorded amplitude peaks, lines of continuity in the peaks of amplitude extending through successive range sweeps, with said lines of continuity being representative of major reflection points on the known object; means for comparing the said lines of continuity to derive first spatial information, for each known object, representative of the relative positions of the respective major reflection points, and for storing in said data base the said first spatial information in the said respective record; a pulse radar for producing signals representing range sweeps across an unidentified object; and comparator means for comparing corresponding second spatial information from at least one range sweep received from an unidentified object with the first spatial information recorded for each type of object in the data base to ascertain whether the unidentified object belongs to one of the known types.

2. A method for recognizing a target comprising: recording peaks of amplitude at different ranges obtained from radar returns representing successive range sweeps across an object of known type as seen from different angles; identifying, in the record lines of continuity in the peaks of amplitude extending through successive range sweeps, with said lines of continuity being representative of major reflection points on the object of known type; comparing the lines of continuity and, from the results of that comparison, creating a data base of first spatial information representing the relative positions of the major reflection points of the object of known type; creating corresponding second spatial information from an unknown object; and comparing said corresponding second spatial information from at least one range sweep across the unidentified object with the said first spatial information to ascertain whether the unidentified object is of the known type.

* * * * *